Patented Jan. 23, 1934

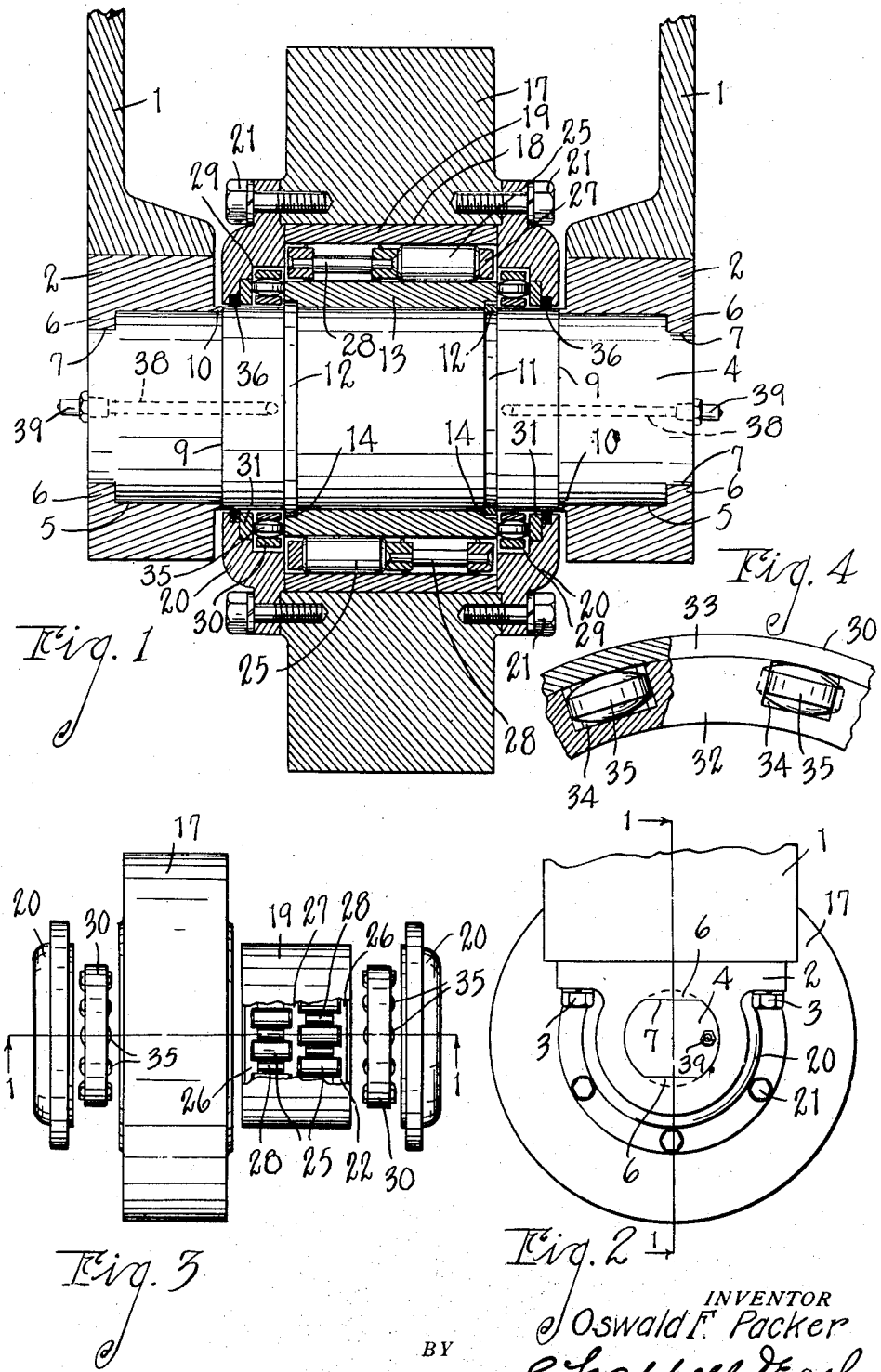

1,944,364

UNITED STATES PATENT OFFICE 1,944,364

ROLLER BEARING

Oswald F. Packer, Lawton, Mich., assignor to Stearns-Stafford Roller Bearing Company, Lawton, Mich.

Application September 28, 1932
Serial No. 635,161

5 Claims. (Cl. 308—174)

The main objects of this invention are to provide an improved roller bearing which is well adapted for heavy work or to sustain heavy loads—for example, bearings for the wheels of railway turntables.

A further object is to provide a roller bearing in which the parts are arranged so that they may be very readily assembled and disassembled as occasion requires even when installed in an apparatus such as a turntable.

Objects relating to details and economies of my invention will appear from the description to follow. The invention is defined and pointed out in the claims.

A structure which is a preferred embodiment of my invention is illustrated in the accompanying drawing, in which:

Fig. 1 is a fragmentary vertical section of a structure embodying the features of my invention, the section being taken on a line corresponding to line 1—1 of Figs. 2 and 3.

Fig. 2 is a fragmentary view in end elevation.

Fig. 3 is a view in side elevation of the parts arranged in the order of their assembly, a portion of the outer bushing being broken away.

Fig. 4 is an enlarged fragmentary view in end elevation of a thrust bearing unit, a portion of the race being broken away and shown in section.

In the embodiment of my invention illustrated, 1, 1 represent a pair of hangers or supports to the underside or lower end of which I detachably secure the shaft supporting brackets 2 as by means of the bolts 3. These brackets have aligned sockets 5, 5 receiving the ends of the shaft 4. The shaft supporting brackets are provided with lugs 6 which project into recesses 7 in the ends of the shaft for securing the shaft against rotation.

The ends of the shaft are preferably reduced to provide outwardly facing shoulders 9 which abut the inwardly extending annular flanges 10 on the brackets.

The shaft is provided with annular grooves 11 adapted to receive the split rings 12 by means of which the inner bearing member 13 is secured against longitudinal movement upon the shaft. This inner bearing member 13 has internal rabbet-like recesses 14 at its ends to receive these retaining rings. With this arrangement, the bearing member may be removed from either end of the shaft as occasion requires. It is to be noted, however, that one of the rings may be in the form of a shoulder or rib integral with the shaft which will permit the removal from one end only.

The wheel 17 has a central opening 18 concentric with the inner bearing member and receiving the outer radial bearing member 19. This outer bearing member is held in position by means of the end collars or flanges 20 which are detachably secured to the wheel by means of the bolts 21.

A radial bearing unit 22 is disposed between the inner and outer bearing members and consists of a double series of anti-friction rollers 25, the rollers of one series being arranged in staggered relation relative to the rollers of the other series. These rollers are held in place by means of cages consisting of end rings 26 and the center ring 27, the rings being connected in assembled relation by means of pins 28 disposed between the rollers and extending from the center ring to the outer rings. This radial bearing is capable of sustaining very heavy loads, the load being uniformly supported by rollers at all times.

The wheel flanges or collars 20 are provided with internally facing stepped recesses 29 in which are disposed radial thrust bearing units 30. Seated in the intermediate steps of these recesses are thrust bearing rings 31 which are supported in opposed spaced relation to the ends of the inner cylindrical bearing 13, the ends of which constitute thrust bearing members. The thrust bearing units each comprise an annular race member 32 having recesses therein to receive the rollers 35, annular retaining members 33 being sleeved over the members 32 to close the roller receiving recesses 34. The rollers 35 are supported by these cages in coacting relation to the ends of the inner bearing member 13 and the thrust rings 31, these thrust rings 31 also serving as inner retaining members for the gaskets 36 which are arranged in the outer steps of the recesses.

I preferably provide lubricant conduits 38 leading from the ends of the shaft and terminating at their inner ends in laterally disposed portions opening to the periphery of the shaft so that lubricant is discharged into the bearing. These conduits are preferably provided with grease gun fittings 39. By this means, the lubricant can be quickly introduced to the bearing and is retained therein by means of the packing 36.

My improved bearing is quite simple in structure and the parts are so arranged that they may be quickly and easily assembled and disassembled and are adapted to sustain very heavy loads, the structure illustrated being especially designed for use on railway turntables for which purpose it has proven highly satisfactory. In the event it is desired to remove a wheel for purpose of renewal or repair, it is rendered fully accessible by removing the brackets and either end flange may be removed to afford access to the parts within or both removed to enable the forcing out of the outer bearing member should that be desired.

I have not attempted to illustrate or describe certain other embodiments or adaptations which I contemplate as it is believed that this disclosure will enable those skilled in the art to which my invention relates to embody or adapt the same as may be desired.

Having thus described my invention, what I claim as new and desire to secure by Letters Patent, is:

1. In a roller bearing, the combination with a shaft having spaced annular grooves therein, an inner bearing member arranged on said shaft and having internal shoulders at the ends thereof flush with the inner edges of said grooves, retaining rings for said inner bearing member engaged in said grooves and coacting with said shoulders, a wheel having an outer bearing member therein, an anti-friction unit coacting with said bearing members and comprising a double series of rollers and cages therefor, the rollers of one series being arranged in staggered relation to the rollers of the other, end flanges having stepped inwardly facing annular recesses secured to said wheel in supporting engagement with said outer bearing member, annular thrust bearing cages arranged in the inner steps of said recesses, bearing rollers arranged in said cages to coact with the ends of said inner bearing member, and thrust rings arranged in the intermediate steps of said recesses in opposed relation to the ends of said inner bearing member and coacting with said thrust bearing rollers, said thrust rings constituting retaining means for gaskets arranged in the outer steps of said recesses.

2. In a roller bearing, the combination with a shaft having spaced annular grooves therein, an inner bearing member arranged on said shaft and having internal shoulders at the ends thereof flush with the inner edges of said grooves, retaining rings for said inner bearing member engaged in said grooves and coacting with said shoulders, a wheel having an outer bearing member therein, an anti-friction unit coacting with said bearing members and comprising a double series of rollers and cages therefor, the rollers of one series being arranged in staggered relation to the rollers of the other, end flanges having annular recesses secured to said wheel in supporting engagement with said outer bearing member, annular thrust bearing cages arranged in said recesses, bearing rollers arranged in said cages to coact with the ends of said inner bearing member, and thrust rings arranged in said recesses in opposed relation to the ends of said inner bearing member and coacting with said thrust bearing rollers.

3. In a roller bearing, the combination with a shaft having spaced annular grooves therein, an inner bearing member arranged on said shaft and having internal shoulders at the ends thereof flush with the inner edges of said grooves, retaining rings for said inner bearing member engaged in said grooves and coacting with said shoulders, a wheel having an outer bearing member therein, bearing rollers coacting with said bearing members, end flanges having stepped inwardly facing annular recesses secured to said wheel in supporting engagement with said outer bearing member, annular thrust bearing cages arranged in the inner steps of said recesses, bearing rollers arranged in said cages to coact with the ends of said inner bearing member, and thrust rings arranged in the intermediate steps of said recesses in opposed relation to the ends of said inner bearing member and coacting with said thrust bearing rollers, said thrust rings constituting retaining means for gaskets arranged in the outer steps of said recesses.

4. In a roller bearing, the combination with a shaft, of an inner bearing member on said shaft, a wheel having an outer bearing member, rollers coacting with said bearing members, recessed end flanges secured to said wheel in supporting engagement with said outer bearing member, annular thrust bearing cages arranged in said recesses, bearing rollers arranged in said cages to coact with the ends of said inner bearing member, and thrust bearing rings arranged in said recesses in opposed relation to the ends of said inner bearing member to coact with said thrust bearing rollers, said thrust rings constituting inner gasket supporting members.

5. In a roller bearing, the combination with a shaft, an inner bearing member arranged on said shaft, a wheel having an outer bearing member therein, an anti-friction unit coacting with said bearing members and comprising a plurality of series of rollers and cages therefor, the rollers of different series being arranged in staggered relation, end flanges having annular recesses secured to said wheel in supporting engagement with said outer bearing member, annular thrust bearing cages arranged in said recesses, bearing rollers arranged in said cages to coact with the ends of said inner bearing member, and thrust rings arranged in said recesses in opposed relation to the ends of said inner bearing member and coacting with said thrust bearing rollers.

OSWALD F. PACKER.